May 18, 1954     R. C. WILLIAMS ET AL     2,678,703
BRAKE MECHANISM
Filed April 3, 1951     2 Sheets-Sheet 1
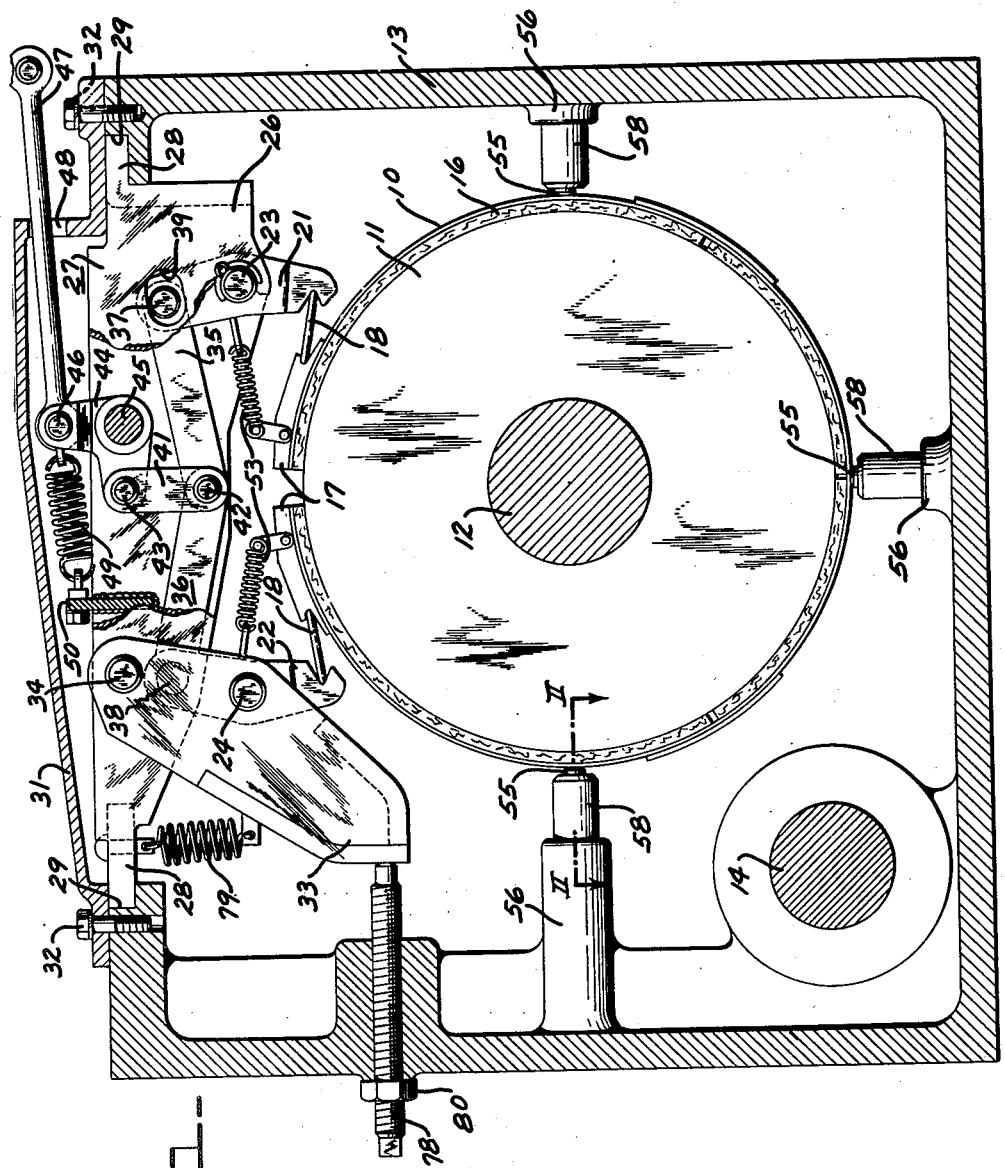
INVENTORS.
Russell C. Williams
Karl J. Mogk
James W. Cambron
Ivan R. Lamport
BY Charles M. Fryer
ATTORNEY

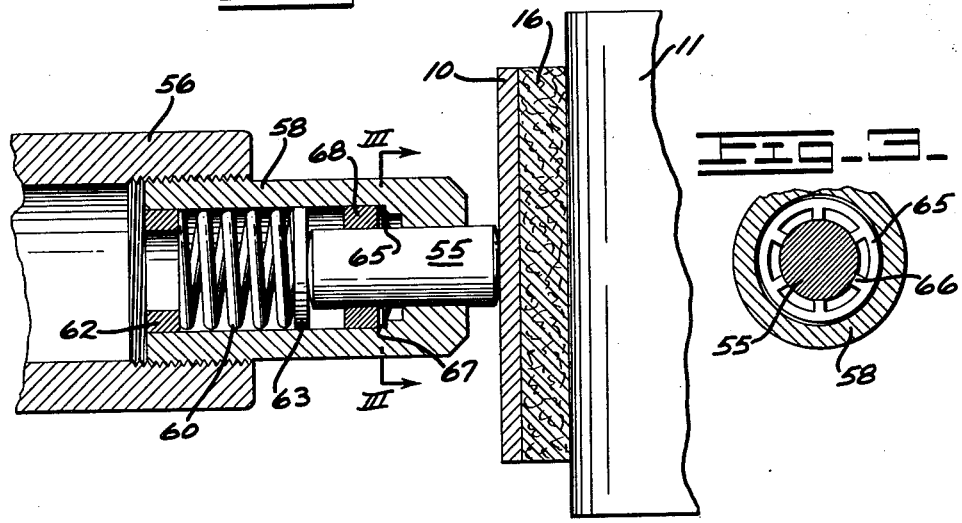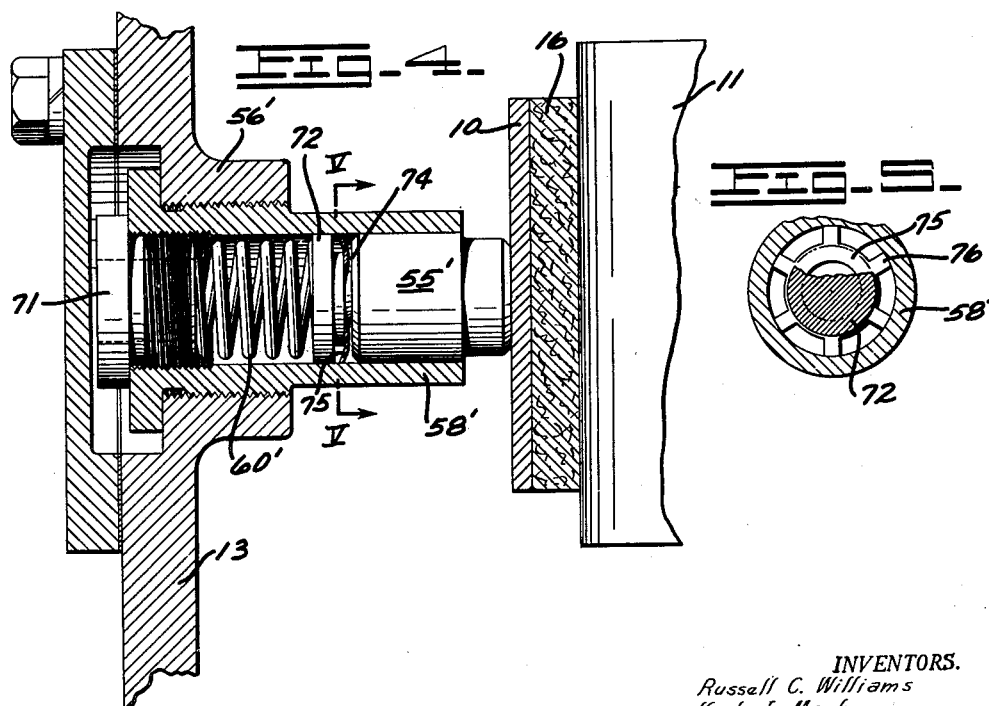

Patented May 18, 1954

2,678,703

UNITED STATES PATENT OFFICE 2,678,703

BRAKE MECHANISM

Russell C. Williams, Karl J. Mogk and James W. Cambron, Peoria, and Ivan R. Lamport, East Peoria, Ill., assignors to Caterpillar Tractor Co., Peoria, Ill., a corporation of California Application April 3, 1951, Serial No. 219,034

2 Claims. (Cl. 188—77)

This invention relates to brakes of the kind in which a brake band embraces a drum and to the operating mechanism therefor.

Although the present invention will have many applications, it is especially adapted for use with and will be disclosed herein in a form suitable for the steering mechanism of a track type tractor.

In a track type tractor, steering is accomplished by means of steering clutches permitting the interruption of power to either of the tracks. A brake is provided on the driven side of each clutch and includes a brake drum and an encircling brake band adapted to be brought into frictional contact with the drum to completely stop the adjacent track. In one type of brake the band is anchored at one end, and the other end is connected with movable linkage actuated by a foot pedal to bring the band into contact with the drum. This type of brake has several disadvantages, as for example, only a part of the drum periphery is engaged by the band requiring the use of relatively high engaging pressure, and due to the direction of the engaging force high radial loads are imposed on the bearings supporting the drum. In addition, these brakes are difficult to service and adjust.

It is, therefore, an object of the present invention to provide a band type brake in which substantially the entire periphery of the brake drum is engaged by the brake band during operation of the brake. It is another object of this invention to provide a brake actuating mechanism in which the direction of forces urging the brake band into engagement minimize the unbalanced radial loads acting on the drum. It is another object of this invention to provide a brake in which all of the control mechanism is supported from a single bracket structure which may be easily removed from the enclosing housing with the supported mechanism to facilitate repair and assembly. Another object of this invention is to provide a plurality of supports for the brake band which operate automatically to maintain a desired clearance between the brake band and the drum despite wear of the friction lining.

Other objects and advantages of this invention will be made apparent in the following description in which reference is made to the accompanying drawings.

In the drawings:

Fig. 1 is a view in side elevation of a brake embodying the present invention with the housing shown in section and with parts broken away to illustrate details of construction;

Fig. 2 is a fragmentary sectional view taken along the line II—II of Fig. 1;

Fig. 3 is a sectional view taken along the line III—III of Fig. 2;

Fig. 4 is a longitudinal sectional view through a modified form of the mechanism shown in Figs. 2 and 3; and Fig. 5 is a sectional view taken along the line V—V of Fig. 4.

In Fig. 1, a brake embodying the present invention is illustrated as comprising a brake band 10 almost completely encircling a drum 11 rigidly secured to a shaft 12 extending through and supported for rotation by bearings, not shown, in walls of a housing 13 enclosing the mechanism. When the brake shown is applied to a tractor, the outer end of the shaft 12 may carry a gear for driving a sprocket carried for rotation on a shaft 14 extending from the housing. The sprocket is adapted to drive the endless track mechanism of the tractor in a conventional manner.

The brake band is preferably lined with a friction material 16 adapted upon contraction to be brought into frictional engagement with the drum. The ends of the brake band carry pads 17 to provide seats for the reception of struts 18 extending outwardly in opposite directions substantially tangent to the periphery of the drum. At their opposite ends, the struts 18 are received in seats provided in the ends of levers 21 and 22 supported intermediate their ends for rocking movement about pins 23 and 24 respectively. The pin 23 is carried in spaced downwardly projecting plate like parts 26 of a bracket structure 27 suspended within an access opening in housing 13. The bracket structure is provided with flanged ends 28 received in recesses 29 provided in the periphery of the opening which is normally closed by a cover 31 secured to the housing as by cap screws 32. The pin 24 is carried intermediate the ends of a lever 33 which at one end is pivotally supported about a pin 34 carried in the depending plates 26 of bracket 27. The lever 33 is formed with spaced sides arranged to embrace the two plates 26 and to form bearings for both ends of the pin 24.

Levers 21 and 22 are connected to links 35 and 36 respectively by pins 37 and 38. The ends of pins 37 and 38 extend through openings, only one of which is illustrated at 39 provided in the depending plates 26 of bracket 27. The openings 39 are elongated to allow rocking movement of levers 21 and 22 about their supporting pins 23 and 24. The links 35 and 36 are connected to each other and to a link 41 by a pin 42. Link 41 is connected by a pin 43 to a bellcrank lever 44 supported for rocking movement about a shaft 45 carried in the bracket 27. The other leg of the bellcrank is connected as by a pin 46 to a link 47 extending outwardly through an opening 48 provided in cover 31. Link 47 may be connected to any suitable brake actuating means such as a foot actuated pedal, not shown. A spring 49 is interposed between the bellcrank 44 and an anchor 50 secured as by welding to the bracket 27, urging the brake actuating linkage toward its normal position of disengagement.

When the brake is applied as by operation of a foot pedal to rock the bellcrank 44 in a clockwise direction, as viewed in Fig. 1, the ends of the brake band are urged toward each other by means of links 41, 35, and 36 and the levers 21 and 22. It is desirable that the brake band tend to wrap itself tightly about the drum thus creating a snubbing action which augments the friction created by the mechanically applied pressure. To accomplish this snubbing action, the brake band should be permitted to travel with the drum for a very short distance, and this travel is limited by engagement of one or the other of the pins 37 and 38 with the end of their respective slots 39. The linkage described through which the brake is applied is arranged to provide an increasing mechanical advantage because of the toggle effect created as the links 35 and 36 move toward a straightened position. Because the brake engaging force is applied to both ends of the brake band, a maximum of frictional contact is obtained throughout the entire periphery of the drum. Furthermore, unbalanced radial loads acting on the drum and its supporting shaft are minimized by the application of forces in a tangent direction as is accomplished by the linkage shown. It is a further advantage of the invention that substantially all of the brake applying mechanism is supported by and removable from the housing for adjustment or repair with the single bracket member 27. To insure separation of the brake band from the drum when the brake is released, springs 53 are connected between the pads 17 on each end of the brake band and the pins 23 and 24.

It is desirable in the released position not only that the brake band be free of contact with the drum, but that it be held in a substantially circular shape and equally spaced from the surface of the drum throughout its length. This is accomplished by stop members which limit the expanding movement of the brake band, but since the effective spacing of the stop members would be changed as the brake lining wears, the stop members herein disclosed are provided with automatic adjusting means for compensating such wear. These stop members are carried in bosses 56 shown as three in number and formed on the interior of the housing 13. As shown in Figs. 2 and 3, each stop member includes a plunger 55 mounted for sliding movement through the end of a sleeve 58 which is threaded into the hollow end of the boss. A spring 60 within the sleeve acts between a fixed collar 62 and a slideable disc 63 to urge the plunger into engagement with the brake band 10. Retraction of the plunger against the spring pressure and consequently the spacing of the brake band from the drum is limited by a ring 65 which embraces the plunger and is positioned between a shoulder 67 in the sleeve and a collar 68 pressed into the sleeve sufficiently tight to prevent it from sliding therein. The structure of the ring 65 enables automatic compensation for wear of the brake lining, and the ring has, as best shown in Fig. 3, a plurality of radially inwardly directed fingers 66 terminating on a circle smaller than the diameter of the plunger 55, and slightly resilient so that they are distorted when the ring is placed on the plunger as shown in Fig. 2. Because of the somewhat angular engagement of the fingers with the surface of the plunger, they bite into or grip the plunger when it is moved in one direction, such as to the left in Fig. 2, but permit it to slide in the opposite direction. Consequently, each time that the brake is applied, the plunger follows the brake band to its extreme inward position, even though in doing so it must move a short distance relative to the ring 65. However, when the brake is released, the retraction of the plunger is limited when the ring 65 abuts the collar 68, and thus the spacing of the liner from the brake drum maintained uniform regardless of wear.

Figs. 4 and 5 show a modification of the structure illustrated in Figs. 2 and 3 wherein similar parts are identified by the same reference characters primed. In this modification, a ring 75 comparable to the ring 65 in Fig. 2 is formed with outwardly projecting fingers 76 which engage the inner wall of the sleeve 58'. This ring is fitted about a reduced portion of a disc 72 which bears against the end of the plunger, and the reduced portion provides a space shown at 74 which determines the limit of retracting movement of the plunger. In this structure, a threaded plug 71 in the sleeve reacts the spring pressure in one direction. In operation, the spring can force the plunger to follow the brake band when it contacts the drum, because the fingers 76 will slide along the inner wall of the sleeve. However, because of their gripping or biting action which occurs when the ring tends to move in the opposite direction, the retracting movement of the plunger is limited by contact with the ring.

As the clearance between the brake band and drum is adjusted automatically by the plungers 55, wear of the brake band lining results in free play in the brake actuating linkage. This free play may be eliminated by swinging lever 33 about pin 34 in a direction to bring the pivotal support 24 for lever 22 closer to lever 21. This may be accomplished by manipulation of a set screw 78 extending through and having a threaded engagement with a wall of the housing 13. At its inner end, the set screw engages the free end of lever 33 which is held in engagement therewith by a spring 79 disposed between the lever and the bracket 27. The set screw 78 is retained in its position of adjustment by a lock nut 80. This adjustment is particularly advantageous, as it is not only easily made, but permits a wide range of adjustment with a minimum change in the geometry of the brake actuating linkage.

We claim:

1. In combination with a brake drum enclosed in a housing having an opening in one wall, a brake band encircling the drum, means supported by the inner walls of the housing and engageable with the brake band to limit its movement away from the drum, a bracket spanning said opening, and means supported entirely by said bracket and engageable with the brake band only adjacent its opposite ends to contract the band about the drum whereby the bracket and contracting means may be separated from the housing without removing the brake band from the housing.

2. In combination with a brake drum enclosed in a housing having an opening in one wall, a brake band encircling the drum, means supported by the inner walls of the housing and engageable with the brake band to limit its movement away from the drum, a bracket spanning said opening, means supported entirely by said bracket and engageable with the brake band only adjacent its opposite ends to contract the band about the drum whereby the bracket and contracting means may be separated from the housing without removing the brake band from the housing, and adjusting means for the band contracting means comprising a lever pivoted to said bracket and a threaded stud extending through the housing to engage and limit the pivotal movement of said lever.

References Cited in the file of this patent

UNITED STATES PATENTS

| Number | Name | Date |
|---|---|---|
| 2,182,386 | Patterson | Dec. 5, 1939 |
| 2,229,919 | Dimont | Jan. 28, 1941 |
| 2,257,722 | Maier | Sept. 30, 1941 |
| 2,395,882 | Knox | Mar. 5, 1946 |